(12) United States Patent
Sheshkus et al.

(10) Patent No.: US 11,854,209 B2
(45) Date of Patent: *Dec. 26, 2023

(54) ARTIFICIAL INTELLIGENCE USING CONVOLUTIONAL NEURAL NETWORK WITH HOUGH TRANSFORM

(71) Applicant: Smart Engines Service, LLC, Moscow (RU)

(72) Inventors: Alexander Vladimirovich Sheshkus, Stary Oskol (RU); Dmitry Petrovich Nikolaev, Moscow (RU); Vladimir L'vovich Arlazarov, Moscow (RU); Vladimir Viktorovich Arlazarov, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,737

(22) Filed: Mar. 20, 2023

(65) Prior Publication Data

US 2023/0245320 A1 Aug. 3, 2023

Related U.S. Application Data

(63) Continuation of application No. 17/237,539, filed on Apr. 22, 2021, now Pat. No. 11,636,608.

(30) Foreign Application Priority Data

Oct. 21, 2020 (RU) .......................... RU2020134599

(51) Int. Cl.
G06T 7/168 (2017.01)
G06N 3/09 (2023.01)
(Continued)

(52) U.S. Cl.
CPC ............. *G06T 7/168* (2017.01); *G06N 3/048* (2023.01); *G06N 3/0464* (2023.01); *G06N 3/09* (2023.01);
(Continued)

(58) Field of Classification Search
None
See application file for complete search history.

(56) References Cited

U.S. PATENT DOCUMENTS

| 11,348,269 B1 * | 5/2022 | Ebrahimi Afrouzi ..... G06T 7/33 |
| 11,636,608 B2 * | 4/2023 | Sheshkus .................. G06T 7/12 382/156 |

(Continued)

OTHER PUBLICATIONS

Sheshkus et al., "HoughNet: neural network architecture for vanishing points detection," arXiv:1909.03812v1 [cs.CV] Sep. 9, 2019 (Year: 2019).*

(Continued)

*Primary Examiner* — Soo Shin
(74) *Attorney, Agent, or Firm* — Procopio, Cory, Hargreaves & Savitch LLP

(57) ABSTRACT

Artificial intelligence using convolutional neural network with Hough Transform. In an embodiment, a convolutional neural network (CNN) comprises convolution layers, a Hough Transform (HT) layer, and a Transposed Hough Transform (THT) layer, arranged such that at least one convolution layer precedes the HT layer, at least one convolution layer is between the HT and THT layers, and at least one convolution layer follows the THT layer. The HT layer converts its input from a first space into a second space, and the THT layer converts its input from the second space into the first space. The CNN may be applied to an input image to perform semantic image segmentation, so as to produce an output image representing a result of the semantic image segmentation.

20 Claims, 6 Drawing Sheets

(51) Int. Cl.
  *G06N 3/048* (2023.01)
  *G06N 3/0464* (2023.01)
(52) U.S. Cl.
  CPC .......... *G06T 2207/20021* (2013.01); *G06T 2207/20061* (2013.01); *G06T 2207/20081* (2013.01); *G06T 2207/20084* (2013.01); *G06T 2207/30256* (2013.01)

(56) References Cited

U.S. PATENT DOCUMENTS

| | | | | |
|---|---|---|---|---|
| 2020/0380675 | A1* | 12/2020 | Golden | G06T 7/143 |
| 2021/0334995 | A1* | 10/2021 | Spence | G06T 7/50 |
| 2022/0198188 | A1* | 6/2022 | Zagaynov | G06V 30/414 |
| 2022/0366682 | A1* | 11/2022 | Cha | G06V 10/80 |

OTHER PUBLICATIONS

Das Neves Junior et al., "HU-PageScan: a fully convolutional neural network for document page crop," IET Image Process., 2020, vol. 14 Iss. 15, pp. 3890-3898 (Year: 2020).*

Warren S McCulloch and Walter Pitts, "A logical calculus of the ideas immanent in nervous activity," The bulletin of mathematical biophysics, vol. 5, No. 4, pp. 115-133, 1943.

Oludare Isaac Abiodun, Aman Jantan, Abiodun Esther Omolara, Kemi Victoria Dada, Nachaat AbdElatif Mohamed, and Humaira Arshad, "State-of-the-art in artificial neural network applications: a survey," Heliyon, vol. 4, No. 11, pp. e00938, 2018.

Thomas Elsken, Jan Hendrik Metzen, and Frank Hutter, "Neural architecture search: a survey," Journal of Machine Learning Research, vol. 20, No. 55, pp. 1-21, 2019.

Seokju Lee, Junsik Kim, Jae Shin Yoon, Seunghak Shin, Oleksandr Bailo, Namil Kim, Tae-Hee Lee, Hyun Seok Hong, Seung-Hoon Han, and In So Kweon, "Vpgnet: Vanishing point guided network for lane and road marking detection and recognition," in Proceedings of the IEEE international conference on computer vision, 2017, pp. 1947-1955.

Ali Borji, "Vanishing point detection with convolutional neural networks," arXiv preprint arXiv:1609.00967, 2016.

Olaf Ronneberger, Philipp Fischer, and Thomas Brox, "U-net: Convolutional networks for biomedical image segmentation," CoRR, vol. abs/1505.04597, 2015.

Jose Dolz, Christian Desrosiers, and Ismail Ben Ayed, "Ivd-net: Intervertebral disc localization and segmentation in mri with a multi-modal unet," in International Workshop and Challenge on Computational Methods and Clinical Applications for Spine Imaging. Springer, 2018, pp. 130-143.

Ke Ma, Zhixin Shu, Xue Bai, Jue Wang, and Dimitris Samaras, "Docunet: document image unwarping via a stacked u-net," in Proceedings of the IEEE Conference on Computer Vision and Pattern Recognition, 2018, pp. 4700-4709.

Weibo Liu, Zidong Wang, Xiaohui Liu, Nianyin Zeng, Yurong Liu, and Fuad E Alsaadi, "A survey of deep neural network architectures and their applications," Neurocomputing, vol. 234, pp. 11-26, 2017.

A. Sheshkus, A. Ingacheva, V. Arlazarov, and D. Nikolaev, "Houghnet: Neural network architecture for vanishing points detection," in 2019 International Conference on Document Analysis and Recognition (ICDAR), Sep. 2019, pp. 844-849, doi:10.1109/ICDAR.2019.00140.

A. Sheshkus, A. Chirvonaya, D. Nikolaev, and V. L. Arlazarov, "Vanishing point detection with direct and transposed fast hough transform inside the neural network," arXiv preprint arXiv:2002.01176, 2020.

Sargur N Srihari and Venugopal Govindaraju, "Analysis of textual images using the hough transform," Machine vision and Applications, vol. 2, No. 3, pp. 141-153, 1989.

Omar Boudraa, Walid Khaled Hidouci, and Dominique Michelucci, "Using skeleton and hough transform variant to correct skew in historical documents," Mathematics and Computers in Simulation, vol. 167, pp. 389-403, 2020.

Yusuke Takezawa, Makoto Hasegawa, and Salvatore Tabbone, "Robust perspective rectification of cameracaptured document images," in Document Analysis and Recognition (ICDAR), 2017 14th IAPR International Conference on. IEEE, 2017, vol. 6, pp. 27-32.

Prabir Bhattacharya, Azriel Rosenfeld, and IsaacWeiss, "Point-to-line mappings as hough transforms," Pattern Recognition Letters, vol. 23, No. 14, pp. 1705-1710, 2002.

Jonathan Long, Evan Shelhamer, and Trevor Darrell, "Fully convolutional networks for semantic segmentation," in Proceedings of the IEEE conference on computer vision and pattern recognition, 2015, pp. 3431-3440.

Nahum Kiryati and Alfred M Bruckstein, "Heteroscedastic hough transform (htht): an efficient method for robust line fitting in the 'errors in the variables' problem," Computer Vision and Image Understanding, vol. 78, No. 1, pp. 69-83, 2000.

Vladimir Arlazarov, Konstantin Bulatov, Timofey Chernov, and V.L. Arlazarov, "MIDV-500: a dataset for identity document analysis and recognition on mobile devices in video stream," Computer Optics, vol. 43, pp. 818-824, Oct. 2019, doi:10.18287/2412-6179-2019-43-5-818-824.

Konstantin Bulatov, Daniil Matalov, and Vladimir Arlazarov, "MIDV-2019: challenges of the modern mobile-based document OCR," vol. 11433, pp. 717-722, Jan. 2020, doi:10.1117/12.2558438.

Aleksandr Gayer, Yuliya Chernyshova, and Alexander Sheshkus, "Effective real-time augmentation of training dataset for the neural networks learning," in ICMV 2018. Mar. 2019, vol. 11041, SPIE, DOI: 10.1117/12.2522969.

* cited by examiner

ARTIFICIAL INTELLIGENCE USING CONVOLUTIONAL NEURAL NETWORK WITH HOUGH TRANSFORM

CROSS-REFERENCE TO RELATED APPLICATIONS

The present application is a continuation of U.S. patent application Ser. No. 17/237,539, filed on Apr. 22, 2021, which claims priority to Russian Patent App. No. 2020134599, filed on Oct. 21, 2020, which are both hereby incorporated herein by reference as if set forth in full.

BACKGROUND

Field of the Invention

The embodiments described herein are generally directed to machine-learning for image segmentation, and, more particularly, to semantic image segmentation using a neural network with a Hough transform, such as a Fast Hough Transform (FHT).

Description of the Related Art

Neural networks, and primarily convolutional neural networks (CNNs), have become popular in the context of computer vision, as demonstrated by "State-of-the-art in artificial neural network applications: A survey," Abiodun et al., Heliyon, vol. 4, no. 11, e00938, 2018, and "Neural Architecture Search: A Survey," Elsken et al., Journal of Machine Learning Research, vol. 20, no. 55, pp. 1-21, 2019, which are hereby incorporated herein by reference as if set forth in full. This popularity is partially inspired by the ready availability of computational resources and training frameworks. Specifically, all that is needed is the appropriate training data (e.g., supported by an ever-increasing supply of public datasets), the appropriate architecture, and an appropriate methodology. However, neural networks often fail due to a lack of understanding about how they process data and what certain architectures can and cannot do.

For example, in "VPGNet: Vanishing Point Guided Network for Lane and Road Marking Detection and Recognition," Lee et al., Proceedings of the IEEE International Conference on Computer Vision, pp. 1947-55, 2017, and "Vanishing point detection with convolutional neural networks," Borji, arXiv:1609.00967, 2016, which are both hereby incorporated herein by reference as if set forth in full, the authors employed an AlexNet-like architecture to detect vanishing points in road scenes. However, vanishing-point detection cannot be solved with local features and fully connected layers having large numbers of parameters. In addition, the resulting neural network tends to be overfitted, as demonstrated by the fact that the neural networks in these papers tend to choose central regions of input images, as heavily represented in the training data.

In the context of semantic image segmentation, the most popular neural network is the U-Net, as described, for example, in "U-Net: Convolutional Networks for Biomedical Image Segmentation," Ronneberger et al., Computer Vision and Pattern Recognition, arXiv:1505.04597, 2015, which is hereby incorporated herein by reference as if set forth in full. U-Nets have been used, in varying scope, from medicine to non-linear distortion correction of documents, to solve area-specific tasks, as demonstrated by "IVD-Net: Intervertebral disc localization and segmentation in MRI with a multi-modal UNet," Dolz et al., Int'l Workshop and Challenge on Computational Methods and Clinical Applications for Spine Imaging, Springer, pp. 130-43, 2018, and "DocUNet: Document Image Unwarping via A Stacked U-Net," Ma et al., Proceedings of the IEEE Conference on Computer Vision and Pattern Recognition, pp. 4700-09, 2018, which are both incorporated herein by reference as if set forth in full. An important consideration in semantic image segmentation is the computational cost. Specifically, the size and speed of neural networks has become crucial in the contexts of limited resources (e.g., mobile devices, such as smartphones) and real-time decision-making (e.g., autonomous vehicles).

While new architectures continue to be developed, most of them are simply different combinations of previously known layers. What is needed is a lightweight neural network model that is suitable for systems with limited computational resources (e.g., mobile devices, autonomous vehicles, etc.), and which can outperform heavier models in specific tasks (e.g., detection of vanishing points).

SUMMARY

Accordingly, systems, methods, and non-transitory computer-readable media are disclosed for semantic image segmentation using a neural network with a Hough transform (e.g., FHT).

In an embodiment, a method is disclosed that uses at least one hardware processor to: store a convolutional neural network comprising three or more convolution layers, a Hough Transform (HT) layer, and a Transposed Hough Transform (THT) layer, arranged such that a first subset of at least one of the three or more convolution layers precede the HT layer, a second subset of at least one of the three or more convolution layers follow the HT layer and precede the THT layer, and a third subset of at least one of the three or more convolution layers follow the THT layer, wherein the HT layer converts an output of the first subset from a first space into a second space, and wherein the THT layer converts an output of the second subset from the second space into the first space; and, for each of a plurality of input images, apply the convolutional neural network to the input image to perform semantic image segmentation to the input image, so as to produce an output image representing a result of the semantic image segmentation. The method may further comprise using the at least one hardware processor to, prior to applying the convolutional neural network to the plurality of input images, train the convolutional neural network using at least one dataset comprising a plurality of images. The convolutional neural network may be an autoencoder, wherein the first subset implements an encoding process, wherein the second subset implements a core process, and wherein the third subset implements a decoding process.

The first space may be a Cartesian space representing pixels in an image as (x, y) coordinates, and the second space may be a Hough parameter space representing one or more lines in the image as (s, α) coordinates. The HT layer may be a Fast Hough Transform layer, and the THT layer may be a Transpose Fast Hough Transform layer. The (s, α) coordinates may be computed from the (x, y) coordinates according to the following relationships: for any lines that are mostly vertical, $s=x_0+y_1-\alpha/2$, $\alpha=y_1-(x_1-x_0)$, and, for any lines that are mostly horizontal, $s=y_0+\alpha/2$, $\alpha=x_1-(y_0-y_1)$. The second subset of at least one convolution layer may operate in the second space to remove non-linear features of the one or more lines.

The second subset may comprise a plurality of convolution layers. The second subset may comprise at least four convolution layers. The second subset may consist of four convolution layers. Each of the first subset and the third subset may comprise a plurality of convolution layers. The first subset and the third subset may consist of the same number of convolution layers as each other.

An activation function of a final convolution layer in the third subset may comprise softmax, wherein an activation function of at least one of the three or more convolution layers, other than the final convolution layer, may comprise softsign. The activation function of all of the three or more convolution layers, other than the final convolution layer, may comprise softsign.

Each of the three or more convolution layers may utilize reflection padding to maintain a fixed image size. The method may be performed using the at least one hardware processor in a mobile device, wherein the convolutional neural network is stored in a memory of the mobile device. The method may be performed using the at least one hardware processor in a controller of an autonomous vehicle. In an embodiment, the number of parameters used in the three or more convolution layers does not exceed a magnitude of $10^4$. The three or more convolution layers may comprise twelve convolution layers.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for semantic image segmentation using a neural network with a Hough transform (e.g., FHT). In particular, direct and transposed integral operators for a Fast Hough Transform may be added to the architecture of a lightweight convolutional neural network, to thereby split the convolutional layers of the lightweight convolutional neural network into three blocks: a first block preceding the direct Fast Hough Transform, a second block between the direct Fast Hough Transform and the Transposed Fast Hough Transform, and a third block following the Transposed Fast Hough Transform. The resulting neural network is a partially convolutional neural network, as opposed to a fully convolutional neural network. By virtue of the introduction of the Fast Hough Transform, the neural network acquires the ability to make a decision at every point (e.g., pixel) using integral features along different lines. Advantageously, the disclosed convolutional neural network with the Fast Hough Transform (also referred to herein as a "HoughEncoder") does not increase the complexity of the neural network in terms of the number of trainable parameters. Experiments on the HoughEncoder (e.g., using publicly available datasets, such as MIDV-500 and MIDV-2019, for training and testing), have demonstrated that the HoughEncoder outperforms U-Net, producing state-of-the art results in many semantic image segmentation tasks, while requiring at least one-hundred times fewer parameters.

After reading this description, it will become apparent to one skilled in the art how to implement the invention in various alternative embodiments and for alternative uses. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Processing Device

Figure 1:
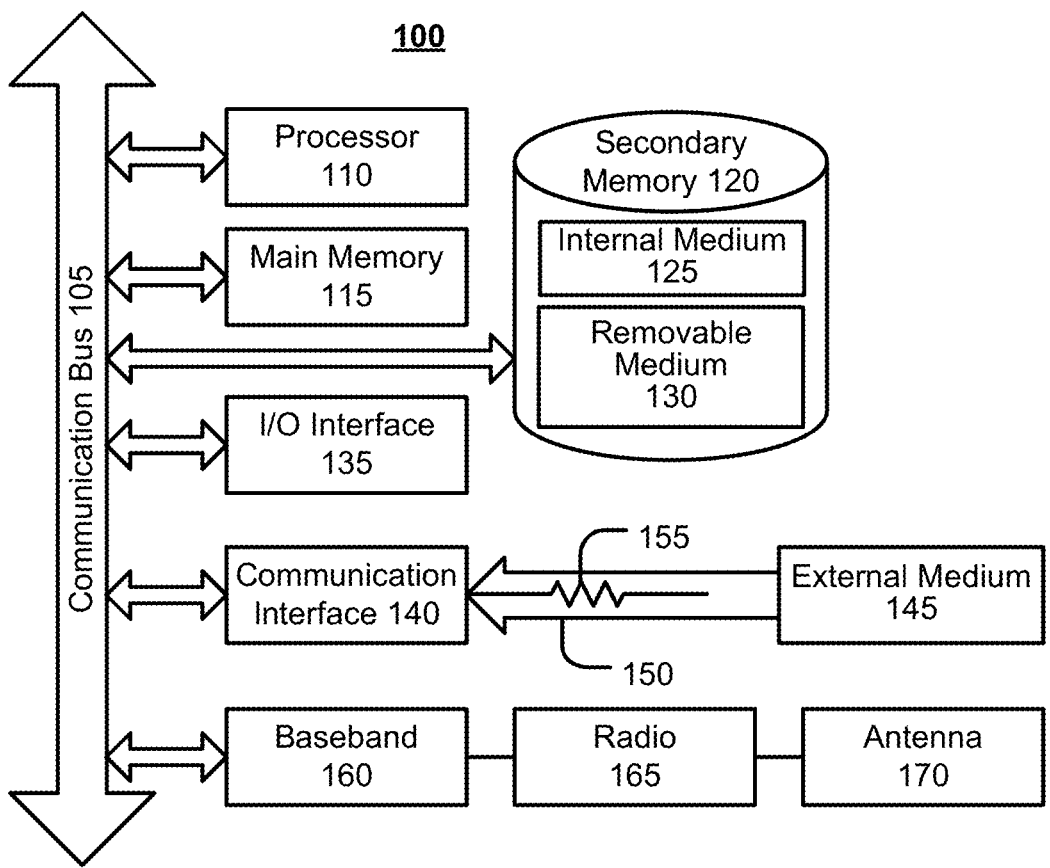
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used to execute one or more of the functions, processes, or methods described herein (e.g., to store and/or execute the application or one or more software modules of the application). System 100 can be a server (e.g., which services requests over one or more networks, including, for example, the Internet), a personal computer (e.g., desktop, laptop, or tablet computer), a mobile device (e.g., smartphone), a controller (e.g., in an autonomous vehicle, robot, etc.), or any other processor-enabled device that is capable of wired or wireless data communication. Other computer systems and/or architectures may be also used, as will be clear to those skilled in the art.

In an embodiment, system 100 may be embedded or comprised within a larger device or other apparatus to imbue it with artificial intelligence (AI) or other automation capabilities, such as computer vision. For example, system 100 may be comprised in a fully or partially autonomous vehicle or robot, and configured to sense objects in the surrounding environment of the vehicle or robot and/or navigate the vehicle or robot around sensed objects. In other words, system 100 may host and execute the artificial intelligence (e.g., including computer vision) that controls a smart apparatus.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 100 preferably includes a main memory 115 and may also include a secondary memory 120. Main memory 115 provides storage of instructions and data for programs executing on processor 110, such as one or more of the functions, processes, and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., disclosed software modules) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 115 and/or secondary memory 120. Computer programs can also be received via communication interface 140 and stored in main memory 115 and/or secondary memory 120. Such computer programs, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and/or external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device, in the console of a vehicle, etc.).

In an embodiment, I/O interface 135 provides an interface to a camera (not shown). for example, system 100 may be a mobile device, such as a smartphone, tablet computer, or laptop computer, with one or more integrated cameras (e.g., rear and front facing cameras). Alternatively, system 100 may be a desktop or other computing device that is connected via I/O interface 135 to an external camera. In either case, the camera captures images (e.g., photographs, video, etc.) for processing by processor(s) 110 (e.g., executing the disclosed software) and/or storage in main memory 115 and/or secondary memory 120.

System 100 may also include optional wireless communication components that facilitate wireless communication over a voice network and/or a data network. The wireless communication components comprise an antenna system 170, a radio system 165, and a baseband system 160. In such an embodiment, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 may decode the signal and convert it to an analog signal. Then, the signal is amplified and sent to a speaker. Baseband system 160 may also receive analog audio signals from a microphone. These analog audio signals may be converted to digital signals and encoded by baseband system 160. Baseband system 160 can also encode the digital signals for transmission and generate a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 may also be communicatively coupled with processor 110, which may be a central processing unit (CPU). Processor 110 has access to data storage areas 115 and 120. Processor 110 is preferably configured to execute instructions (i.e., computer programs, such as the disclosed application, or software modules) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Architecture

An embodiment of an application for semantic image segmentation will now be described. The semantic image segmentation may be used in a variety of contexts, such as in computer vision, which refers to the ability of computers to understand and automate tasks performed by the human visual system. Other potential contexts include image analysis, digital image processing, and/or the like. The application may comprise one or more software modules stored in secondary memory 120, and loaded in main memory 115 to be executed by one or more processors 110. In an embodiment, the application comprises a lightweight neural network model that utilizes a Hough Transform (HT) to outperform heavier models in specific tasks. Specifically, a Hough Transform (HT) layer may be used to transform the feature space in which the core layers of the neural network operate. In addition, a Transpose Hough Transform (THT) layer may be used to transform the result of the neural network's operation back into the original space. The Hough Transform is described, for example, in "Point-to-line mappings as Hough Transforms," Bhattacharya et al., Pattern Recognition Letters, vol. 23, no. 14, pp. 1705-10, 2002, and U.S. Pat. No. 3,069,654, issued Dec. 18, 1962, which are both hereby incorporated herein by reference as if set forth in full.

In an embodiment, the HT that is used may be a Fast Hough Transform (FHT). The inventors have previously used the Fast Hough Transform (FHT) in neural networks to detect vanishing points in images. For instance, in "HoughNet: neural network architecture for vanishing points detection," Sheshkus et al., 2019 Int'l Conference on Document Analysis and Recognition (ICDAR), doi:10/1109/ICDAR.2019.00140, pp. 844-9, September 2019, which is hereby incorporated herein by reference as if set forth in full, a neural network architecture was proposed for detecting a vanishing point outside an image. In "Vanishing Point Detection with Direct and Transposed Fast Hough Transform inside the neural network," Sheshkus et al., arXiv: 2002.01176, 2020, which is hereby incorporated herein by reference as if set forth in full, a neural network architecture with Fast Hough Transform layers was proposed for detecting a vanishing point inside an image. In the disclosed embodiment, an HT-based neural network is taken further to perform the task of semantic image segmentation (e.g., for computer vision). Examples may be described herein primarily in the context of detecting the edges of documents within images. However, it should be understood that the disclosed embodiments may be applied to detect the boundary lines of any object or any other set of lines in an image.

Figure 2:
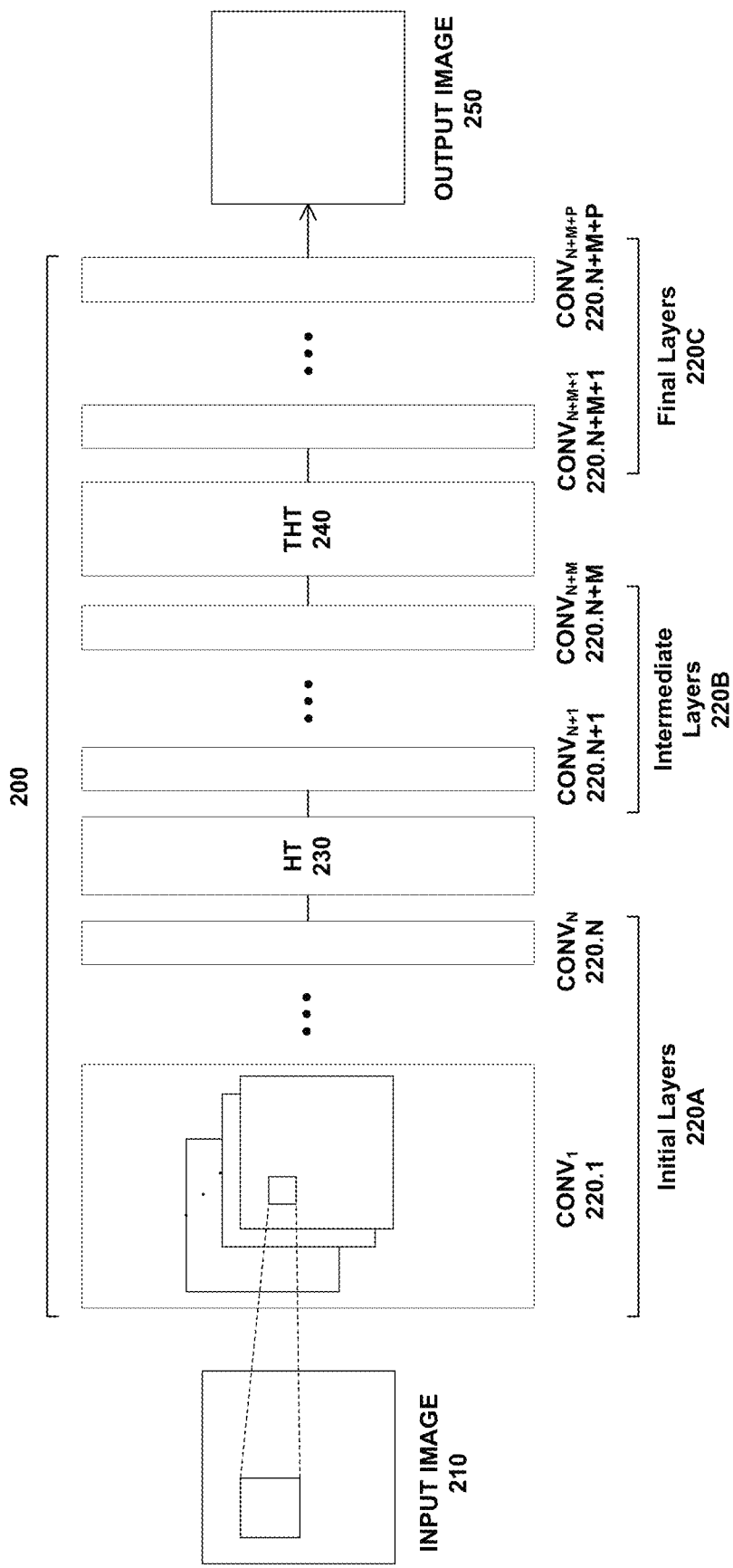
FIG. 2 illustrates a lightweight convolutional neural network, according to an embodiment.

In an embodiment, the lightweight neural network model comprises a convolutional neural network (CNN) with a plurality of layers, including a plurality of convolution layers, at least one Hough Transform layer (e.g., an FHT layer) and at least one subsequent Transpose Hough Transform layer (e.g., a Transpose FHT (TFHT) layer). FIG. 2 illustrates such a neural network, according to an embodiment. As illustrated, the neural network comprises a convolutional neural network 200, which receives and processes an input image 210, using one or more convolution layers 220, preceding, between, and/or after an HT layer 230 and a THT layer 240, to produce a segmented output image 250. Convolution layer(s) 220 that precede HT layer 230 may be collectively referred to herein as initial layers or a first subset 220A, convolution layer(s) 220 between HT layer 230 and THT layer 240 may be collectively referred to herein as intermediate layers or a second subset 220B, and convolution layer(s) 220 that follow THT layer 240 may be collectively referred to herein as final layers or a third subset 220C. In the case that convolutional neural network 200 represents an autoencoder, first subset 220A comprises one or more convolution layers that implement an encoding process, second subset 220B comprises one or more convolution layers that implement a core process, and third subset 220C comprises one or more convolution layers that implement a decoding process.

In one particular implementation, convolutional neural network 200 comprises fourteen layers. The configuration of these layers is described, layer by layer and in order, in Table 1 below:

TABLE 1

| No. | Type | Parameters | | | |
|---|---|---|---|---|---|
| | | No. of Filters | Filter Size | Stride | Activation Function |
| 1 | Convolutional | 4 | 3 × 3 | 1 × 1 | softsign |
| 2 | Convolutional | 8 | 3 × 3 | 2 × 2 | softsign |
| 3 | Convolutional | 16 | 3 × 3 | 2 × 2 | softsign |
| 4 | Convolutional | 16 | 3 × 3 | 1 × 1 | softsign |
| 5 | HT | — | — | — | — |
| 6 | Convolutional | 16 | 3 × 3 | 1 × 1 | softsign |
| 7 | Convolutional | 16 | 3 × 3 | 1 × 1 | softsign |
| 8 | Convolutional | 16 | 3 × 3 | 1 × 1 | softsign |
| 9 | Convolutional | 16 | 3 × 3 | 1 × 1 | softsign |
| 10 | THT | — | — | — | — |
| 11 | Convolutional | 8 | 3 × 3 | 0.5 × 0.5 | softsign |
| 12 | Convolutional | 4 | 3 × 3 | 0.5 × 0.5 | softsign |
| 13 | Convolutional | 4 | 3 × 3 | 1 × 1 | softsign |
| 14 | Convolutional | 2 | 3 × 3 | 1 × 1 | softmax |

Notably, in Table 1, layers 1-4, 6-9, and 11-14 correspond to convolution layers 220—and more specifically, layers 1-4 correspond to convolution layers 1 through N in FIG. 2, layers 6-9 correspond to convolution layers N+1 through N+M in FIG. 2, and layers 11-14 correspond to convolution layers N+M+1 through N+M+P in FIG. 2. In addition, layer 5 corresponds to HT layer 230, and layer 10 corresponds to THT layer 240. The fact that the stride of layers 11 and 12 are 0.5×0.5 indicates that these layers are transposed convolution layers (also referred to as "deconvolution layers").

In an embodiment, softsign is used as the activation function for most of the convolution layers 220 (e.g., all but the final convolution layer 14 in Table 1 corresponding to convolution layer N+M+P in FIG. 2). Advantageously, softsign is simple and has a non-zero derivative. Softsign also has a bounded output value, for example, on the scale of [−1, 1]. In alternative embodiments, a different activation function (e.g., sigmoid, tanh, rectified linear unit (ReLU), etc.) may be used for one or more of convolution layers 220, and different convolution layers 220 may utilize different activation functions.

Convolutional neural network 200 comprises HT layer 230. Since a Hough transformation cannot produce a single image for an entire angle range (see, e.g., Bhattacharya et al.), the Hough transformation produces an image of two parts: a first part for angles in the range of [−45°, 45°], and a second part for angles in the range [45°, 135°], jointed vertically.

HT layer 230 transforms every line in the (x, y) space of input image 210 (e.g., a Cartesian space) into an (s, α) space (e.g., a Hough parameter space). Specifically, in an embodiment that uses FHT, (s, α) coordinates can be computed from the (x, y) coordinates of a line using Equation (1) for mostly vertical lines and using Equation (2) for mostly horizontal lines:

$$s = x_0 + h - \alpha/2, \quad \text{Equation (1)}$$

$$\alpha = h - (x_1 - x_0),$$

$$\text{wherein } y_0 = 0, y_1 = h$$

$$s = y_0 + \alpha/2, \quad \text{Equation (2)}$$

$$\alpha = w - (y_0 - y_1),$$

$$\text{wherein } x_0 = 0, x_1 = w$$

Conversely, THT layer 240 transforms every line in the (s, α) space back into the (x, y) space of input image 210. Specifically, in an embodiment that uses TFHT, (x, y) coordinates can be computed from the (s, α) coordinates of a line using the relationships expressed in Equation (1) for mostly vertical lines and Equation (2) for mostly horizontal lines.

Notably, convolutional neural network 200 comprises one or more intermediate convolutional layers 220B between HT layer 230 and THT layer 240. In the particular implementation described above, there are a plurality of intermediate layers 220B, represented as $CONV_{N+1}$ to $CONV_{N+M}$ in FIG. 2 and layers 6-9 in Table 1. However, it should be understood that there may be any number of intermediate layers 220B. Intermediate layers 220B operate in the (s, α) space to extract or remove complex non-linear features along the different lines in input image 210. In an embodiment, window operations are used to account for imperfect input data with noise and outliers, as expressed, for example, in "Heteroscedastic Hough Transform (HtHT): An Efficient Method for Robust Line Fitting in the 'Errors in the Variables' Problem," Kiryati et al., Computer Vision and Image Understanding, vol. 78, no. 1, pp. 69-83, 2000, which is hereby incorporated herein by reference as if set forth in full.

In an embodiment, all convolution layers 220 use padding to maintain consistency in the input and output image sizes and to avoid false activation on the edges of the feature maps. In a particular implementation, reflection padding may be used. Reflection padding uses the contents of a row to pad the values of a directly adjacent row. This can ensure that outputs of a convolution layer 220 transition smoothly into the padding.

With the above architecture, convolutional neural network 200 produces an output image 250 in the same coordinate space as input image 210. Therefore, convolutional neural network 200 can be used as an autoencoder. An autoencoder is a special type of neural network that transforms input values in input image 210 to output values in output image 250. In this case, initial layers 220A may implement the encoding process of the autoencoder, intermediate layers 220B may implement the core process of the autoencoder, and final layers 220C may implement the decoding process of the autoencoder. The encoding process compresses the input values of input image 210, HT layer 230 transforms the output of the encoding process from (x, y) space into (s, α) space, the core process performs the essential functions in the (s, α) space (e.g., removing non-linear features along lines represented in the input values), THT layer 240 transforms the output of the core process from (s, α) space into (x, y) space, and the decoding process mirrors the encoding process to reconstruct the values of input image 210 in the form of output image 250. Since the core process operates in the (s, α) space, as a result of the Hough Transform, the neural network can make decisions at each point (e.g., at each pixel) using features along all lines that intersect that point. This allows the neural network to solve complex cases (e.g., remove complex non-linear features), even when the size of its receptive field is small.

3. Process Overview

Embodiments of processes for semantic image segmentation using a lightweight neural network with a Fast Hough Transform will now be described in detail. It should be understood that the described processes may be embodied in one or more software modules that are executed by one or more hardware processors processor 110, for example, as a software application or library. The described processes may be implemented as instructions represented in source code, object code, and/or machine code. These instructions may be executed directly by the hardware processor(s) 110, or alternatively, may be executed by a virtual machine operating between the object code and the hardware processor(s) 110. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

3.1. Production of Neural Network

Figure 3:
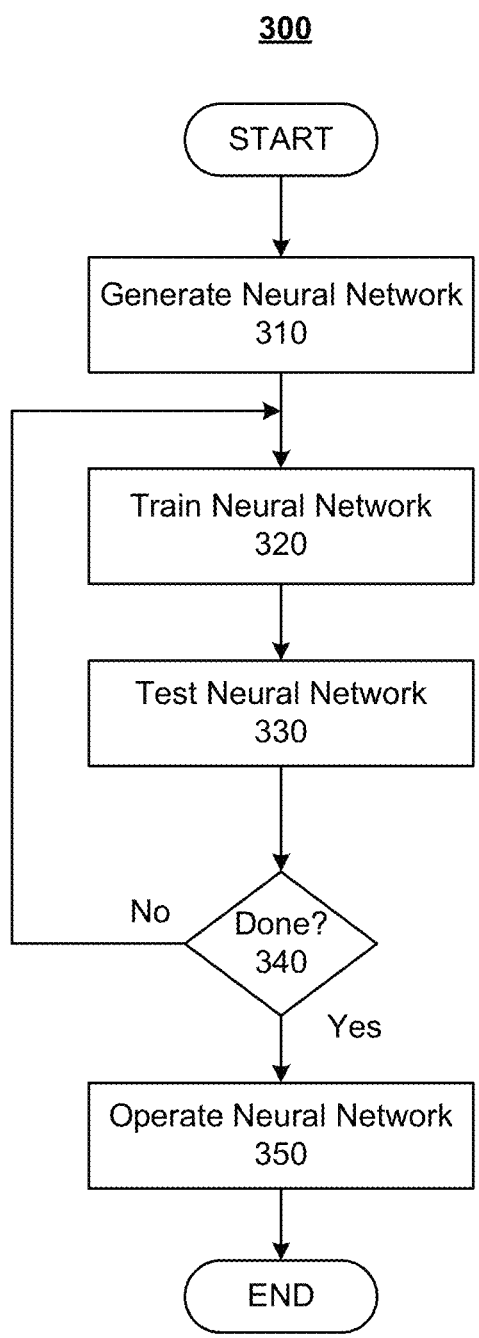
FIG. 3 illustrates a process for producing a lightweight convolutional neural network, according to an embodiment.

FIG. 3 is a flowchart illustrating the production of a neural network, according to an embodiment. For example, process 300 may be utilized to produce convolutional neural network 200.

In subprocess 310, the neural network is generated. In an embodiment, subprocess 310 comprises constructing convolutional neural network 200. For example, convolutional neural network 200 may be constructed to have the specific layers described in Table 1. Alternatively, convolutional neural network 200 may be constructed to have a different set of layers than those described in Table 1. However, in a preferred embodiment, the general architecture of convolutional neural network 200 comprises at least a first subset 220A of convolution layers, an HT layer 230 (e.g., a Fast Hough Transform layer), a second subset 220B of convolution layers, a THT layer 240 (e.g., a Transpose Fast Hough Transform layer), and a third subset 220C of convolution layers, in that order.

In subprocesses 320 and 330, the neural network, generated in subprocess 310, is trained and tested, respectively. For example, convolutional neural network 200 may be trained and tested using a plurality of images from one or more datasets. In an embodiment of a convolutional neural network 200 that is to be used to perform semantic image segmentation on images of documents, the dataset(s) may comprise the Mobile Identity Document Video (MIDV)-500 dataset and/or the MIDV-2019 dataset. Before images are used to train and/or test convolutional neural network 200, the images may be converted to greyscale and scaled to a fixed dimension (e.g., 256 pixels by 256 pixels) using cropping, down-sampling, and/or up-sampling.

As described in "MIDV-500: A Dataset for Identity Documents Analysis and Recognition on Mobile Devices in Video stream," Arlazarov et al., Computer Optics, vol. 43, doi:10.18287/2412-6179-2019-43-5-818-824, pp. 818-24, October 2019, which is hereby incorporated herein by reference as if set forth in full, MIDV-500 is a fully open dataset that contains frames of fifty different types of documents in various conditions and with complex backgrounds. In an embodiment, the MIDV-500 dataset is divided into two non-overlapping subsets of images: a training subset; and a testing subset. For example, images of the first thirty document types may be used as the training subset, and images of the final twenty document types may be used as the testing subset. However, alternative divisions of the dataset are possible. In a particular implementation, images that did not have at least three corners of the document within the image were excluded from the training and testing subsets. This resulted in 7,217 images in the training subset and 4,748 images in the testing subset, from the MIDV-500 dataset.

As described in "MIDV-2019: Challenges of the modern mobile-based document OCR," Bulatov et al., Computer Vision and Pattern Recognition, vol. 11433, pp. 717-22, doi:10.1117/12.2558438, January 2020, which is hereby incorporated herein by reference as if set forth in full, MIDV-2019 contains frames of documents with strong projective distortions and low lighting conditions. In an embodiment, the MIDV-2019 dataset is divided into two non-overlapping subsets of images: a training subset; and a testing subset. In a particular implementation, the entire MIDV-2019 dataset, except for one document type, was used as the testing subset (e.g., in combination with the testing subset from the MIDV-500 dataset). The remaining document type was used as the training subset (e.g., with the training subset from the MIDV-500 dataset), in order to introduce the heavier projective transformations and wider range of backgrounds from the MIDV-2019 dataset into the training images. It should be understood that alternative divisions of the dataset are possible. Again, images that did not have at least three corners of the document within the image may be excluded. This resulted in 120 images in the training subset and 4,966 images in the testing subset, from the MIDV-2019 dataset.

In subprocess 340, process 300 determines whether additional training and/or testing is warranted. Additional training and/or testing may be warranted where additional datasets are available and/or the results of testing in subprocess 330 indicate that there is the potential for further training to produce performance gains. If more training and/or testing is warranted (i.e., "No" in subprocess 340), process 300 returns to subprocess 320 or 330 to perform additional training and/or testing. Otherwise, if no more training and/or testing is warranted (i.e., "Yes" in subprocess 340), process 300 proceeds to operate the neural network in subprocess 350. Operation of the neural network may comprise operation of convolutional neural network 200 on its own (e.g., as a stand-alone model) or as a part of a larger model or ensemble (e.g., as an initial step in computer vision, image analysis, digital image processing, etc.).

3.2. Operation of Neural Network

Figure 4:
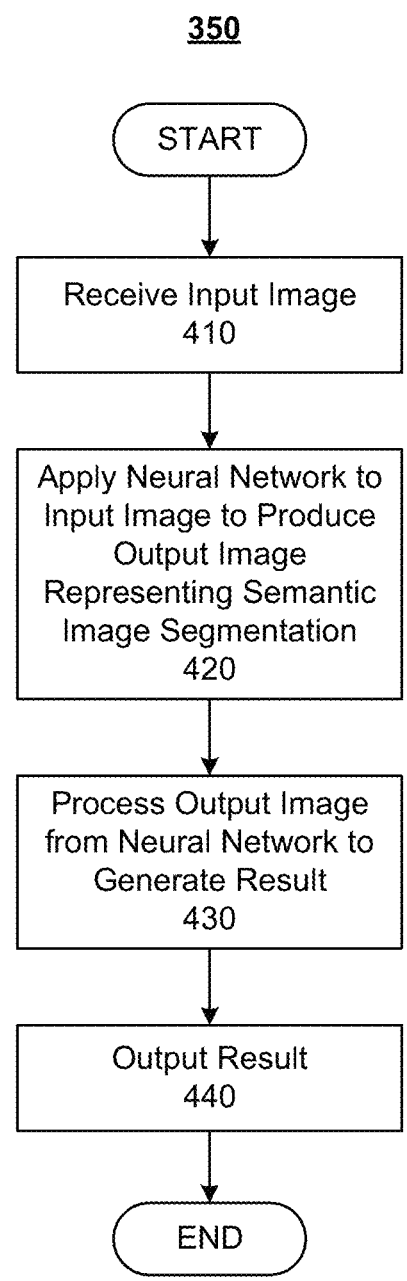
FIG. 4 illustrates a process for operating a lightweight convolutional neural network, according to an embodiment.

FIG. 4 is a flowchart illustrating the operation of a neural network, according to an embodiment of subprocess 350 in process 300. For example, subprocess 350 may be utilized to operate convolutional neural network 200 to perform semantic image segmentation. The result of the semantic image segmentation may be used by itself or as part of a larger process or model (e.g., as an initial step in computer vision, image analysis, digital image processing, etc.).

In subprocess 410, an input image 210 is received. Input image 210 may be a stand-alone image or an image frame of a video. For example, input image 210 may be an image or image frame that has been captured by an imaging device in real time or near real time. This may be the case, for instance, when convolutional neural network 200 is being used for real-time detection or control (e.g., for an autonomous vehicle or robot). Alternatively, in a context in which timing is not important (e.g., document processing), input image 210 may be an image or image frame that was captured in the past.

In subprocess 420, convolutional neural network 200 is applied to input image 210, received in subprocess 410, to produce an output image 250. Output image 250 represents the results of the semantic image segmentation task performed by convolutional neural network 200. For example, output image 250 may comprise a reconstruction of input image 210 with reduced noise (e.g., elimination or reduction of non-linear features, background, etc.). In this case, convolutional neural network 200 may act as an autoencoder. In the context of document images, output image 250 may comprise an outline representing the boundaries of the document. In the context of computer vision of road images for a fully or partially autonomous vehicle, output image 250 may comprise a set of lines representing a roadway (e.g., lane markers, boundaries between the road and shoulder, outlines of road signs, etc.).

In subprocess 430, output image 250, output from convolutional neural network 200, may be further processed to perform one or more additional tasks (e.g., which build upon the results of the semantic image segmentation performed in subprocess 420). For example, in the context of document images, subprocess 430 may comprise image cropping, de-skewing, de-warping, and/or other image corrections to the document detected by convolutional neural network 200, extracting text from within the boundaries of the document, and/or the like. In the context of images captured by an autonomous vehicle or robot, subprocess 430 may comprise identifying one or more objects detected by convolutional neural network 200, and controlling the vehicle or robot to navigate around or with respect to the detected object(s) (e.g., stay within lane markers and/or road boundaries, avoid collisions with other vehicles and/or pedestrians, etc.) and/or triggering some other response to the detection of the object(s) (e.g., adjusting a speed based on a speed limit extracted from a sign, stopping the vehicle based on the detection of a red traffic light and/or stop sign, etc.). It should be understood that subprocess 430 may comprise the application of other artificial intelligence (e.g., neural networks or other machine-learning models, rules-based artificial intelligence, etc.) to the segmented output image 250 produced by convolutional neural network 200.

Regardless of the particular context, a result of subprocess 430 may be output in subprocess 440. The result could be one or more control instructions (e.g., automatic braking, acceleration, steering, signaling, etc.) for a fully or partially autonomous vehicle, robot, or other device or apparatus, data (e.g., text) extracted from a document detected in input image 210 (e.g., as a result of Optical Character Recognition (OCR)), a classification of one or more objects detected in input image 210, and/or the like. It should be understood that the disclosed convolutional neural network 200 with a Fast Hough Transform may be used within any overarching process or model which would benefit from semantic image segmentation, including, without limitation, computer vision, image analysis, digital image processing, and/or the like.

4. Example Performance Results

To evaluate the performance of the disclosed convolutional neural network 200 with a Hough Transform (e.g., Fast Hough Transform), referred to hereafter as the "HoughEncoder," the results of the HoughEncoder were compared to the results of the same convolutional neural network, but without the Hough Transform (i.e., without HT layer 230 and THT layer 240), referred to hereafter as the "NonHoughEncoder." In addition, the results of the HoughEncoder and NonHoughEncoder were compared to the results of a U-Net, which acted as a baseline. Each of the neural networks were trained and tested using the same datasets under the same conditions. In particular, thirty document types from MIDV-500 and one document type from MIDV-2019, with online augmentation with projective distortions for two-hundred epochs, were used as the training dataset for all three neural networks. An example of online augmentation is described in "Effective real-time augmentation of training dataset for the neural networks learning," Gayer et al., ICMV 2018, vol. 11041, SPIE, doi:10.1117/12.2522969, March 2019, which is hereby incorporated herein by reference as if set forth in full.

To account for fluctuations and improve the trustworthiness of the performance results, the training and testing process was run five times, and the average result values were used for comparison. The result values were calculated using the mean intersection over union distance (MIoU), as expressed in Equation (3):

$$MIoU = \frac{1}{N}\sum_{i=0}^{N-1} \frac{A_i \cap G_i}{A_i \cup G_i}, \quad \text{Equation (3)}$$

wherein N equals 2 (representing the background and foreground),
wherein $A_i$ is the answer for the considered class, and
wherein $G_i$ is the ground truth for the considered class.

The experimental results of testing on the HoughEncoder, NonHoughEncoder, and U-Net, using the combination of MIDV-500 and MIDV-2019 datasets described above, are illustrated in Table 2 below:

TABLE 2

| Neural Network | Number of Parameters | MIoU for MIDV-500 | MIoU for MIDV-2019 |
| --- | --- | --- | --- |
| U-Net | $1.96 \times 10^6$ | 0.94 | 0.86 |
| NonHoughEncoder | $1.48 \times 10^4$ | 0.91 | 0.74 |
| HoughEncoder | $1.48 \times 10^4$ | 0.96 | 0.89 |

From the experimental results in Table 2, it is evident that the HoughEncoder outperformed both the NonHoughEncoder and the U-Net. Notably, the U-Net substantially outperformed the NonHoughEncoder. This is not surprising, since the NonHoughEncoder uses substantially fewer parameters than the U-Net and has a much smaller receptive field than the U-net. In contrast, the HoughEncoder substantially outperformed the U-Net, despite using the same number of parameters as the NonHoughEncoder and substantially fewer parameters than the U-Net (e.g., a magnitude of $10^4$ for the HoughEncoder vs. a magnitude of $10^6$ for the U-Net). This indicates that the introduction of the Fast Hough Transform to the architecture of a lightweight neural network transforms the lightweight neural network into a simple, yet powerful, neural network. In other words, HT layer 230 and THT layer 240 improve the neural network's ability to solve the semantic image segmentation task, while maintaining the simplicity (e.g., relatively low resource requirements) of the neural network. In addition, the difference between the MIoU for the MIDV-500 dataset and the MIoU for the MIDV-2019 dataset was larger for the U-Net (i.e., (0.94−0.86=0.08) than for the HoughEncoder (i.e., 0.96−0.89=0.07). This indicates that the U-Net became more overfitted than the HoughEncoder.

Figure 5:
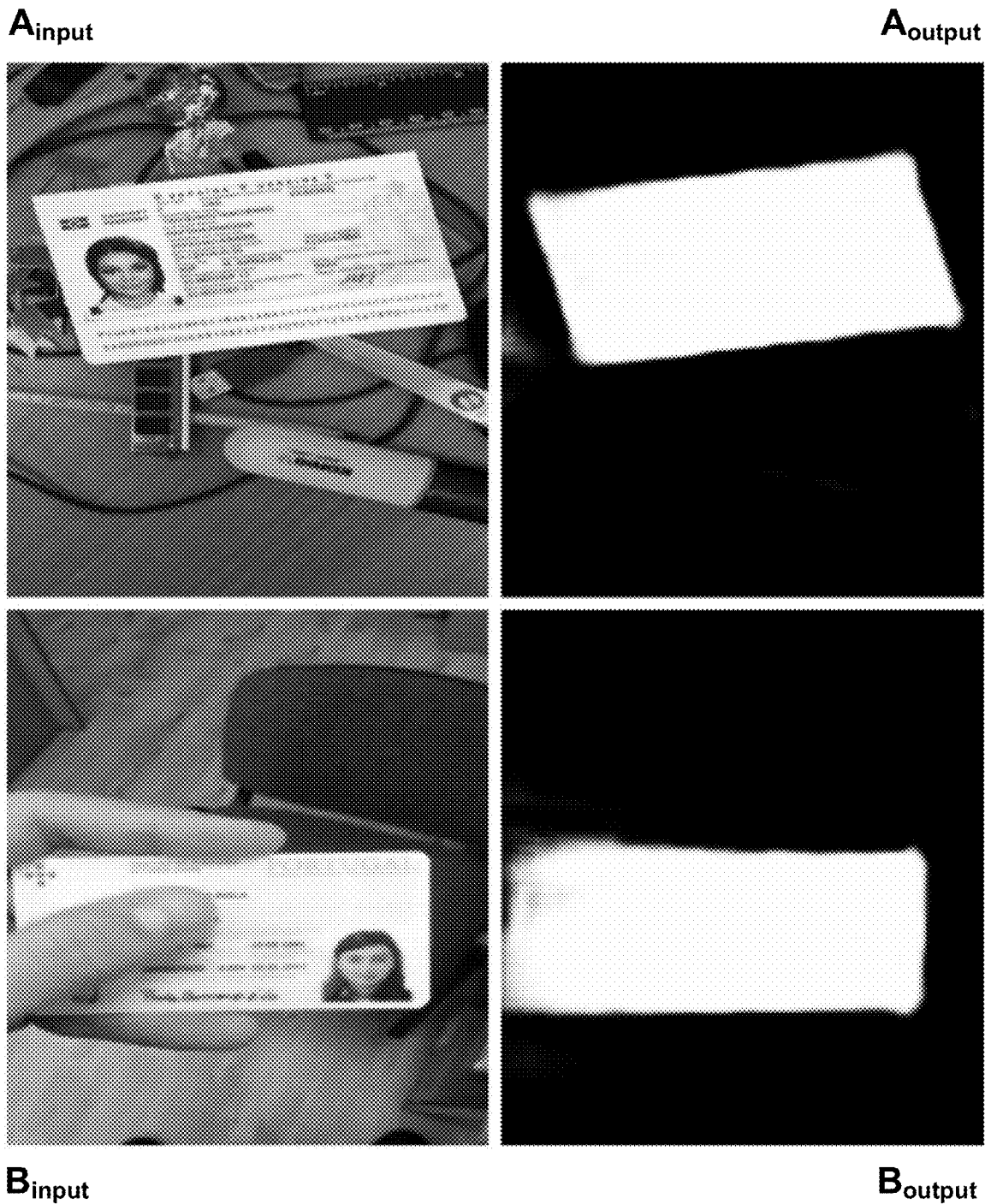
FIG. 5 illustrates example results of a lightweight convolutional neural network, according to an embodiment.

FIG. 5 illustrates input images 210 and output images 250 for two executions of the HoughEncoder, according to an embodiment. $A_{output}$ is the output image 250 produced (e.g., in subprocess 420 by convolutional neural network 200) from $A_{input}$ as an input image 210 (e.g., received in subprocess 410). Similarly, $B_{output}$ is the output image 250 produced (e.g., in subprocess 420 by convolutional neural network 200) from $B_{input}$ as an input image 210 (e.g., received in subprocess 410). Notably, with respect to images A, the HoughEncoder was able to identify the lines defining the boundary of the document (an identification card in the illustrated example), despite a noisy background. With respect to images B, the HoughEncoder was able to identify the lines defining the boundary of the document (again, an identification card in the illustrated example), despite the boundary of the document being partially obscured by two fingers and a thumb of a person holding the document. In other words, the HoughEncoder was able to remove the non-linear features (i.e., backgrounds, thumb and fingers, etc.) from the boundary lines of the documents.

Figure 6:
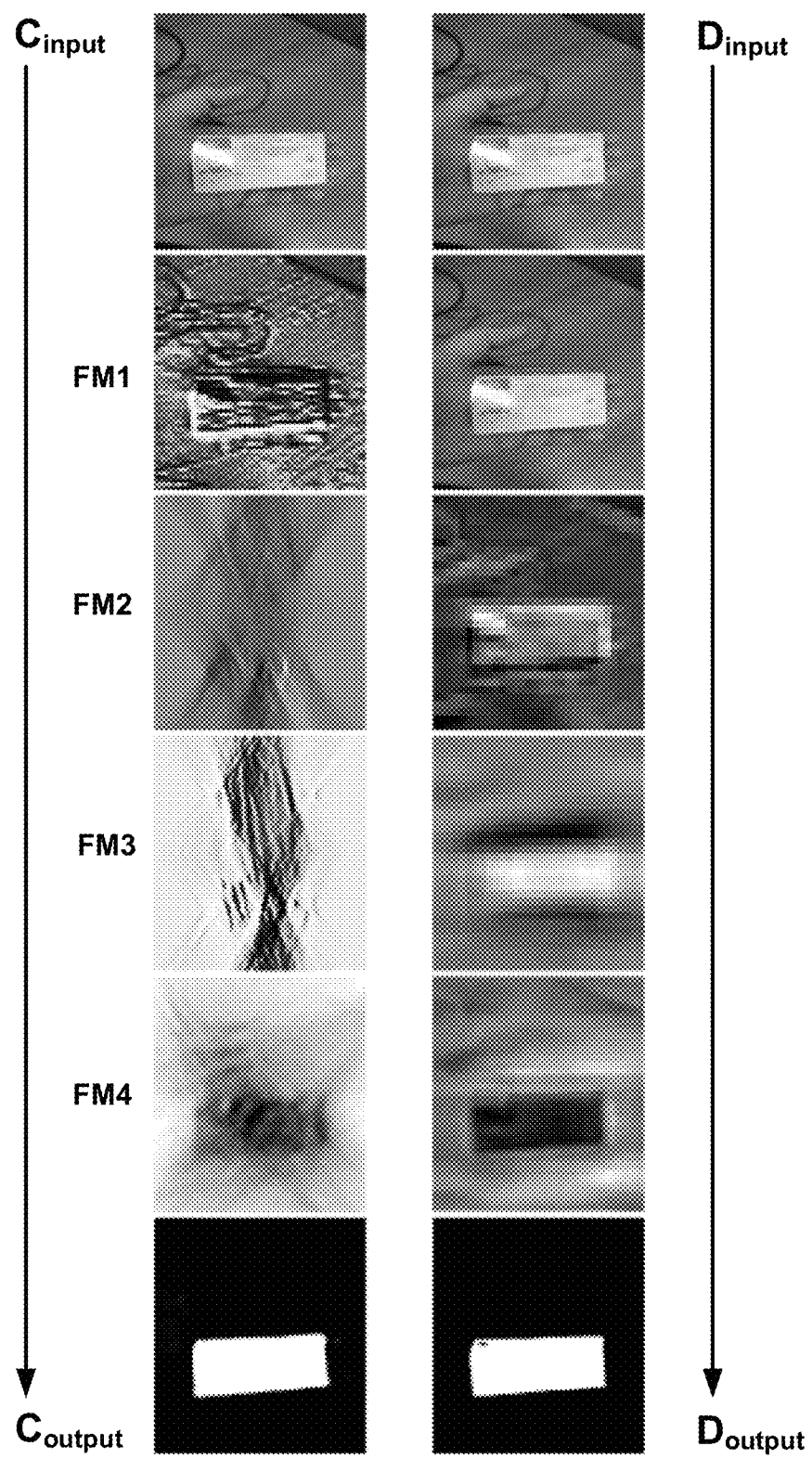
FIG. 6 is a comparison of an example operation of a lightweight convolutional neural network to an example operation of a U-Net, according to an embodiment.

FIG. 6 illustrates input images 210, a set of feature maps, and output images 250 for an execution of the HoughEncoder and an execution of the U-Net, according to an embodiment. The left-side images labeled C represent the HoughEncoder, and the right-side images labeled D represent the U-Net. For better visualization, all of the feature maps have been scaled to 256×256. It should be understood that the features maps FM1-FM4 of the HoughEncoder are produced by convolutional layers 220 of convolutional neural network 200 (e.g., the four intermediate layers 220B).

For example, feature map FM1 may be produced by layer 6, feature map FM2 may be produced by layer 7, feature map FM3 may be produced by layer 8, and feature map FM4 may be produced by layer 9, as represented in Table 1. Due to the architecture of the HoughEncoder, the feature maps FM1-FM4 look substantially different than the corresponding feature maps produced by the convolution layers of the U-Net. Specifically, in deep fully convolutional neural network models, such as U-Net, the features gradually transform from input image 210 to output image 250 (i.e., $D_{input}$ to $D_{output}$). In contrast, the disclosed HoughEncoder inserts two essential barriers, HT layer 230 and THT layer 240, that result in the non-gradual transformation from $C_{input}$ to $C_{output}$. This demonstrates that the Hough Transform introduces new properties into the neural network by allowing it to operate with features in a different space.

Figure 7:
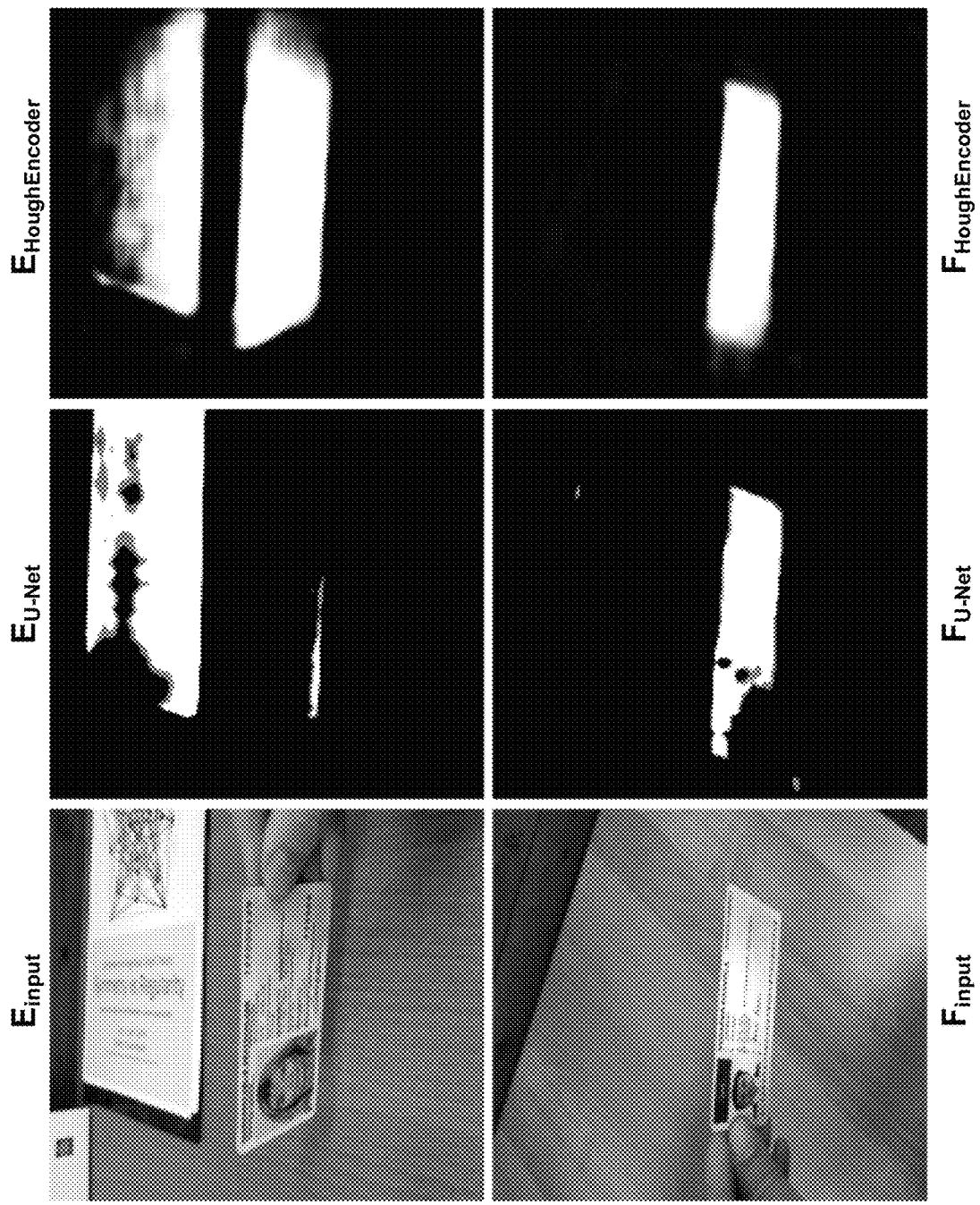
FIG. 7 is a comparison of example results of a lightweight convolutional neural network to example results of a U-Net, according to an embodiment.

FIG. 7 illustrates two complex cases, as processed by both a U-Net and the HoughEncoder, according to an embodiment. Specifically, the input images 210, labeled $E_{input}$ and $F_{input}$, were provided to both the U-Net and the HoughEncoder. From these input images $E_{input}$ and $F_{input}$, the U-Net produced the output images 250, labeled $E_{U-Net}$ and $F_{U-Net}$, whereas the HoughEncoder produced the output images 250, labeled $E_{HoughEncoder}$ and $F_{HoughEncoder}$. As demonstrated by the top portion of the set of E images, both the U-Net and the HoughEncoder struggled, without additional information, to solve the semantic segmentation task when the entire document was not within the boundaries of the image. However, as demonstrated by the bottom portion of the set of E images and by the set of F images, the HoughEncoder outperformed the U-Net on the semantic segmentation task when the document can be distinguished from its overall shape.

The disclosed HoughEncoder could be trained and operated to perform the more complex task of multi-class semantic image segmentation, for example, to classify the pixels or objects (e.g., documents) in an input image 210. In addition, in an embodiment, the HoughEncoder may include bypasses or skip connections over HT layer 230 and THT layer 240. This may improve the HoughEncoder's performance in at least some instances.

5. Hough Transforms

Embodiments have been primarily described herein with respect to a Fast Hough Transform and Transpose Fast Hough Transform. However, embodiments may utilize other types of Hough Transforms. More generally, the term "Hough Transform" refers to any linear image transformation for which an integral value of a linear object in the input image is calculated for every pixel in the output image. Such a transform is also known as a discrete radon transform. There are many versions of this transform, depending on the output space parametrization. Since this transformation is a linear operation, it can be explicitly written as a multiplication with a matrix. The term "Transposed Hough Transform" refers to the operation of multiplication with the transposed matrix of the Hough Transform.

The Fast Hough Transform is simply one example of a Hough Transform that is calculated with the Brady algorithm. The Fast Hough Transform can be advantageous since it works fast. However, other Hough Transforms may be appropriate, including, without limitation, the original variant of the Hough Transform, which does not use recursive line patterns and therefore provides a more accurate calculation than the Fast Hough Transform but with a longer execution time, and the Radon Transform, which is similar to the Fast Hough Transform but uses a different parameterization—$(\rho, \varphi)$ instead of $(s, \alpha)$—such that every point in the input image transforms into a sinusoid instead of line, which can be suitable in some types of algorithms.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
    store a neural network comprising three or more layers, a Hough Transform (HT) layer, and a Transposed Hough Transform (THT) layer, arranged such that a first subset of at least one of the three or more layers precede the HT layer, a second subset of at least one of the three or more layers follow the HT layer and precede the THT layer, and a third subset of at least one of the three or more layers follow the THT layer, wherein the HT layer converts an output of the first subset from a first space into a second space, and wherein the THT layer converts an output of the second subset from the second space into the first space; and
    for each of a plurality of input images, apply the neural network to the input image to produce an output image representing a result of an image-processing task in computer vision.

2. The method of claim 1, further comprising using the at least one hardware processor to, prior to applying the neural network to the plurality of input images, train the neural network using at least one dataset comprising a plurality of images.

3. The method of claim 1, wherein the neural network is an autoencoder, wherein the first subset implements an encoding process, wherein the second subset implements a core process, and wherein the third subset implements a decoding process.

4. The method of claim 1, wherein the first space is a Cartesian space representing pixels in an image as (x, y) coordinates, and wherein the second space is a Hough parameter space representing one or more lines in the image as (s, α) coordinates.

5. The method of claim 4, wherein the HT layer is a Fast Hough Transform layer, and wherein the THT layer is a Transpose Fast Hough Transform layer.

6. The method of claim 5, wherein the (s, α) coordinates are computed from the (x,y) coordinates according to the following relationships:
for any lines that are more vertical than horizontal, $$s = x_0 + y_1 - \alpha/2,$$

$$\alpha = y_1 - (x_1 - x_0), \text{ and,}$$

for any lines that are more horizontal than vertical, $$s = y_0 + \alpha/2,$$

$$\alpha = x_1 - (y_0 - y_1).$$

7. The method of claim 4, wherein the second subset of at least one layer operates in the second space to remove non-linear features of the one or more lines.

8. The method of claim 1, wherein the second subset comprises a plurality of layers.

9. The method of claim 8, wherein the second subset comprises at least four layers.

10. The method of claim 8, wherein each of the first subset and the third subset comprises a plurality of layers.

11. The method of claim 10, wherein the first subset and the third subset consist of a same number of layers as each other.

12. The method of claim 1, wherein an activation function of a final layer in the third subset comprises softmax, and wherein an activation function of at least one of the three or more layers, other than the final layer, comprises softsign.

13. The method of claim 12, wherein the activation function of all of the three or more layers, other than the final layer, comprises softsign.

14. The method of claim 1, wherein each of the three or more layers utilize reflection padding to maintain a fixed image size.

15. The method of claim 1, wherein the method is performed using the at least one hardware processor in a mobile device, and wherein the neural network is stored in a memory of the mobile device.

16. The method of claim 1, wherein the method is performed using the at least one hardware processor in a controller of an autonomous vehicle.

17. The method of claim 1, wherein a number of parameters used in the three or more layers does not exceed a magnitude of $10^4$.

18. The method of claim 1, wherein the three or more layers comprise twelve layers.

19. A system comprising:
    at least one hardware processor; and
    one or more software modules that, when executed by the at least one hardware processor,
        store a neural network comprising three or more layers, a Hough Transform (HT) layer, and a Transposed Hough Transform (THT) layer, arranged such that a first subset of at least one of the three or more layers precede the HT layer, a second subset of at least one of the three or more layers follow the HT layer and precede the THT layer, and a third subset of at least one of the three or more layers follow the THT layer, wherein the HT layer converts an output of the first subset from a first space into a second space, and wherein the THT layer converts an output of the second subset from the second space into the first space, and for each of a plurality of input images, apply the neural network to the input image to produce an output image representing a result of an image-processing task in computer vision.

20. A non-transitory computer-readable medium having instructions stored therein, wherein the instructions, when executed by a processor, cause the processor to:
store a neural network comprising three or more layers, a Hough Transform (HT) layer, and a Transposed Hough Transform (THT) layer, arranged such that a first subset of at least one of the three or more layers precede the HT layer, a second subset of at least one of the three or more layers follow the HT layer and precede the THT layer, and a third subset of at least one of the three or more layers follow the THT layer, wherein the HT layer converts an output of the first subset from a first space into a second space, and wherein the THT layer converts an output of the second subset from the second space into the first space; and,
for each of a plurality of input images, apply the neural network to the input image to produce an output image representing a result of an image-processing task in computer vision.

\* \* \* \* \*